Nov. 11, 1958 D. J. LESLIE Re. 24,566

ACOUSTIC APPARATUS

Original Filed Oct. 26, 1948 3 Sheets-Sheet 1

DONALD J. LESLIE,
INVENTOR.

BY John F. Flam

ATTORNEY

ACOUSTIC APPARATUS

Original Filed Oct. 26, 1948 3 Sheets-Sheet 2

DONALD J. LESLIE,
INVENTOR.

BY John Flam

ATTORNEY

Nov. 11, 1958 D. J. LESLIE Re. 24,566

ACOUSTIC APPARATUS

Original Filed Oct. 26, 1948 3 Sheets-Sheet 3

DONALD J. LESLIE,
INVENTOR.

BY John Flam
ATTORNEY

United States Patent Office

Re. 24,566
Reissued Nov. 11, 1958

24,566

ACOUSTIC APPARATUS

Donald J. Leslie, Pasadena, Calif.

Original No. 2,727,583, dated December 20, 1955, Serial No. 56,630, October 26, 1948. Application for reissue March 18, 1957, Serial No. 646,946

8 Claims. (Cl. 181—27)

Matter enclosed in heavy brackets [ ] appears in the original patent but forms no part of this reissue specification; matter printed in italics indicates the additions made by reissue.

The present invention relates to acoustic apparatus, and is more particularly directed to apparatus for producing musical tones.

This application is a continuation-in-part of my application filed July 9, 1945, Serial No. 603,850, now Patent 2,489,653, for "Acoustic Apparatus," which is a continuation-in-part of my abandoned application filed December 10, 1940, Serial No. 369,413, for "Acoustic Device."

Certain musical instruments, such as electric or electronic organs, produce a normal output which is very limited in musical character. Accordingly, an object of the present invention is to provide apparatus capable of modifying the normal output of musical instruments to produce a broadening effect of the tone quality.

Another object of the present invention is to provide apparatus capable of producing sharp or flat tones, which, when coupled to the original frequencies, results in a very broad effect that may be organ pipe-like in character.

Still another object of the invention is to provide apparatus capable of producing a broadening effect, by adding sharp tones to the original frequencies and by emphasizing the upper band of added frequencies over the lower. In this manner, the effect of a pipe organ containing "celeste" pipes can be simulated. Such pipe organs produce frequencies slightly higher than those associated with general organ tunings.

A further object of the invention is to provide a comparatively simple apparatus capable of broadening the normal output of a musical instrument and of also producing tremolo or vibrato effects.

This invention possesses many other advantages, and has other objects which may be made more clearly apparent from a consideration of several forms in which it may be embodied. Such forms are shown in the drawings accompanying and forming part of the present specification. These forms will now be described in detail illustrating the general principles of the invention; but it is to be understood that such detailed description is not to be taken in a limiting sense, since the scope of the invention is best defined by the appended claims.

Referring to the drawings.

Figure 1:
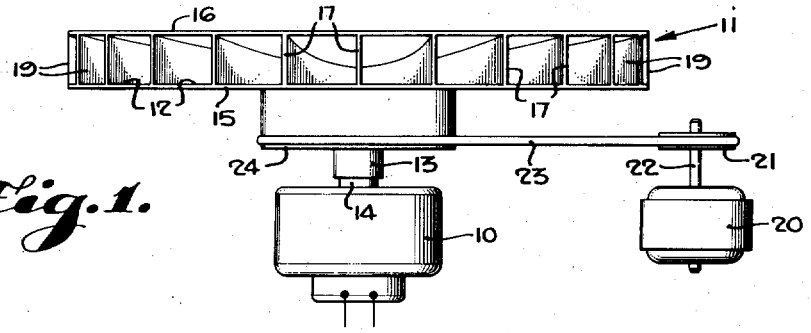
Figure 1 is an elevation of one form of apparatus embodying the invention.

In the form of invention illustrated in Fig. [3,] *1*, the sound emanating from a speaker or sound generator 10 is directed into a rotatable member 11 having equiangularly spaced horn cells 12 radiating from its hub portion 13. By rotating the horn unit at a particular R, P, M., which depends upon its external diameter, the use of the Doppler effect is availed of in producing frequencies heard by the listener that are both sharp and flat, which, together with the original frequencies emanating from the sound generator or speaker 10, produce a very broad pipe-like, organ effect, when the speaker unit forms the electrical output of an electric or electronic organ.

The production of frequencies that are both sharp and flat is obtained because some of the horn cells are advancing toward the ear of the listener, while the other horn cells are receding from the ear.

Figure 2:
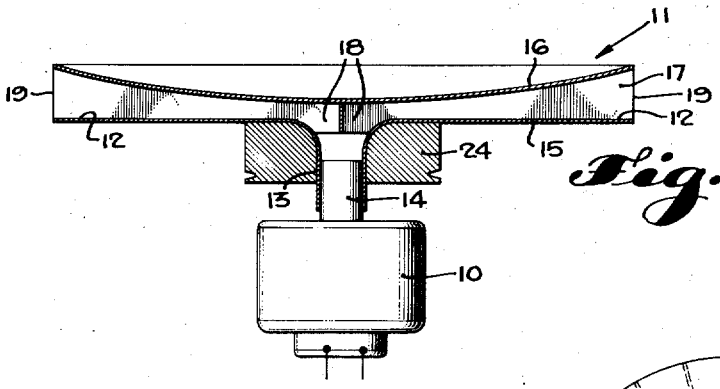
Fig. 2 is a partial cross-sectional and partial elevational view of the cellular horn and speaker or sound generator disclosed in Fig. 1.
Figure 3:
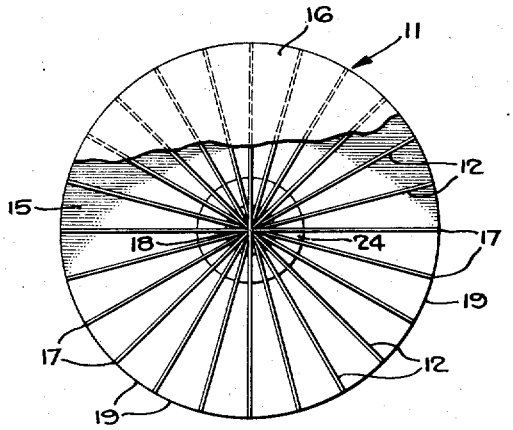
Fig. 3 is a section through one form of cellular horn that may be embodied in the apparatus shown in Fig. 1.

As disclosed most clearly in Figs. 2 and 3, the cellular horn device 11 includes a tubular hub 13 rotatable upon the hollow spindle 14 of the speaker unit 10, the horn has opposed walls 15, 16, one of which is integral with or secured to its tubular hub or throat 13, and the other of which is in spaced relation to the first-mentioned wall. This last-mentioned wall 16 flares outwardly, being of dished or externally concave shape, to obtain exponential expansion of the horn cells. The walls form the horn cells 12 in conjunction with a plurality of radial separators or partitions 17 extending between the walls 15, 16. The separators are suitably secured to the walls, extending from their peripheries to their axis, as disclosed in Figs. 2 and 3, and providing sound inlet openings 18 for each cell in the throat or hub portion 13 of the horn device. The radial separators 17 are spaced uniformly around the horn device so as to provide like, uniformly spaced horn cells, each of which has an inner throat 18 and an outer mouth 19 at the periphery of the horn unit.

The number of horn cells 12 may be varied within comparatively wide limits. The number selected should give good results with a minimum of flutter due to the sound source changing from cell to cell as the horn device rotates. As an example, the number of cells could vary from 4 to 100. It has been found that a horn device with 24 cellular sections gives good results, and that such device can be made without encountering construction difficulties. More cells might be preferable, but any advantage due to further diminution of the flutter is outweighed by manufacturing disadvantages. A 24 section cellular horn provides very little flutter, and, for all practical purposes, effects the desired results. Of course, the flutter effect is to some extent dependent upon the speed at which the unit is rotated.

The horn unit may be rotated by means of a suitable electric motor 20 having a drive pulley 21 secured to its shaft 22. An endless belt 23 passes around this pulley and around a driven pulley 24 suitably secured to the hub 13 of the horn device. As described above, this hub is rotatably mounted on the speaker spindle 14.

The speed of the electric motor 20 and the diameter of the pulleys 21, 24 are chosen so as to rotate the horn unit 11 at the desired speed. This speed is not critical, since the horn unit is not intended to produce tremolo effects. Additionally, the speed selected is dependent upon the outer diameter of the horn unit. As an example, ample broadening effects of the tone quality are obtainable with a horn device having an outer diameter of 17 inches and rotated between 200 and 500 R. P. M., or at a linear peripheral speed of from about 15 to 36 feet per second. Higher and lower linear velocities of the horn mouths 19 may be utilized if desired, although the range of 15 to 36 feet per second mentioned above is preferred. As an example, a horn unit having an outer diameter of 17 inches may be rotated at speeds ranging from 100 to 1200 R. P. M., or at a peripheral velocity as low as about 7 feet per second.

The horn device disclosed in Fig. 3 employs radial separators 17, which, when rotated or moved at the desired horn mouth velocity, accomplishes the desired broadening effect by producing both flat and sharp frequencies in conjunction with the frequencies emitted through the speaker spindle 14.

Figure 4:
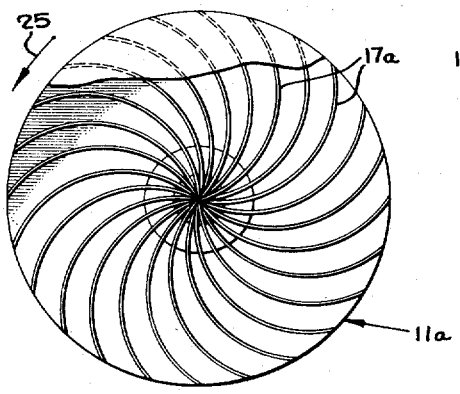
Figs. 4 and 5 are views similar to Fig. 3 of modified forms of cellular horns.
Figure 5:
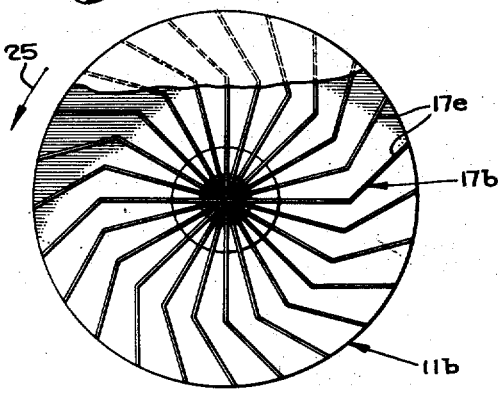

The cellular horn constructions 11a, 11b disclosed in Figs. 4 and 5 are designed to simulate pipe organs containing "celeste" pipes. Such pipe organs produce frequencies slightly higher than those associated with general organ tunings. The cellular horn is designed, as shown in Figs. 4 and 5, in such manner as to emphasize the upper band of added frequencies over the lower band. In Fig. 4, the cell separators 17a are of generally spiral shape, with the concave side of each separator facing in the direction of rotation of the horn device, indicated by the arrow 25. With this arrangement, the cells radiating the upper frequency bands will be louder to the listener than the cells radiating the lower frequency bands. This is due to the particular wave characteristics of the sound. If the direction of rotation of the spiral horn device were reversed, the lower frequency bands would be emphasized over the higher. That is, the convex side of the separators 17a would then face in the direction of rotation of the horn device.

A similar effect can be obtained by means of the horn device 11b shown in Fig. 5, in which the outer portions 17e of the separators 17b are bent in the direction of rotation of the horn device. This arrangement will also emphasize the upper band of added frequencies over the lower.

Figure 6:
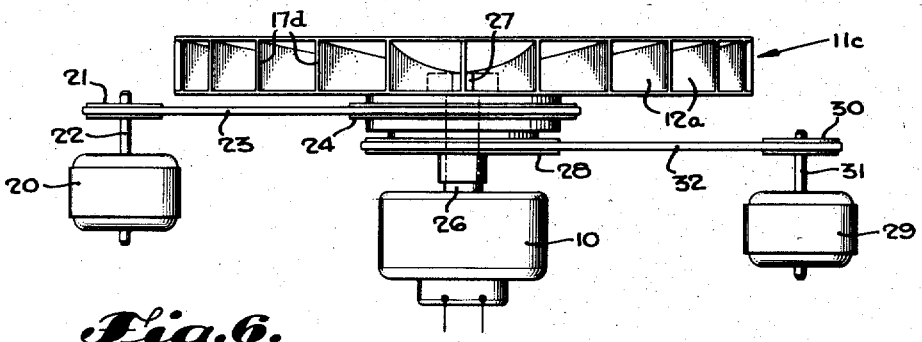
Fig. 6 is an elevational view of still another embodiment of the invention.
Figure 7:
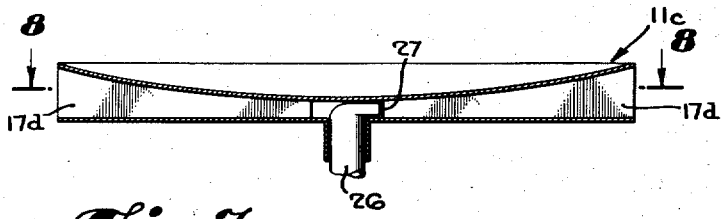
Fig. 7 is a section through part of the apparatus shown in Fig. 6.
Figure 8:
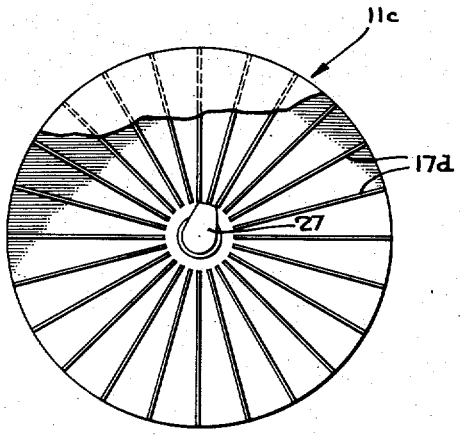
Fig. 8 is a section taken along the line 8—8 on Fig. 7.

In the form of invention illustrated in Figs. 6, 7 and 8, the 360 degree rotating horn device is combined with an arrangement for producing tremolo or vibrato effects. As described and claimed in the above-identified applications, it has been found that pitch tremolo can be imposed on sound by passing the sound through an opening which is rotating about an axis spaced from the opening at a rate of the order of from 5 to 8 cycles per second, or about 300 to 480 R. P. M.

In Figs. 6, 7 and 8, the tremolo effect may be produced by rotating a throat 26 in communication with the speaker 10 at tremolo speeds. This throat 26 extends through the hub 13 of the cellular horn device 11c coaxially therewith, and terminates in a mouth or opening 27 extending transversely to the axis of rotation and within the horn cells 12a. This mouth or opening 27 subtends only one or two cells, as shown most clearly in Fig. 8, so that during its rotation it progressively directs the sound into succeeding cells moving relative to it.

The horn device 11c may be rotated by the same horn motor, belt and pulley arrangement 20—24 disclosed in Figs. 1 and 2. The horn separators 17d, however, terminate short of the horn hub or axis, to allow a circular space within which the throat 26 can rotate. This throat is rotatable upon the spindle 14 of the speaker or sound generator 10 and has a pulley 28 secured to it, provided with a hub portion rotatable within the horn pulley 24. Rotation is effected by means of an electric throat motor 29 having a driving pulley 30 secured to its shaft 31, with an endless belt 32 passing around the drive pulley 30 and the throat pulley 28.

As throat 26 rotates at tremolo speeds of the order above indicated, the throat opening 27 is directed into the various cells of the outer cellular horn assembly 11c and produces the desired tremolo or vibrato effect. The cellular horn assembly itself may be rotated at any desired speed, or can be stopped entirely, depending upon the broadening effect, or lack of broadening effect, desired.

Figure 9:
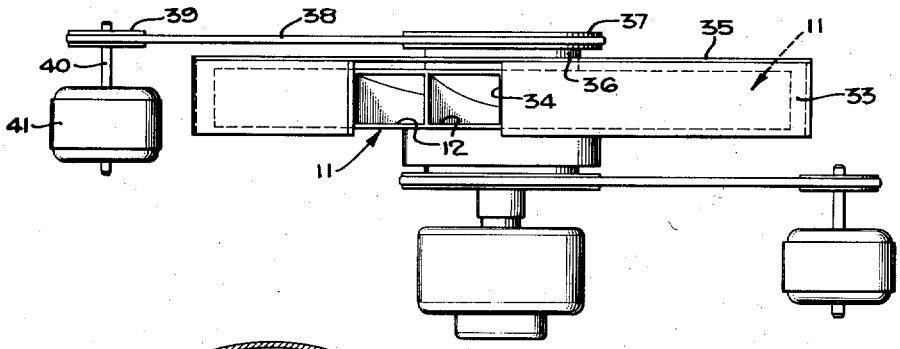
Fig. 9 is an elevation of still another embodiment of the invention.
Figure 10:
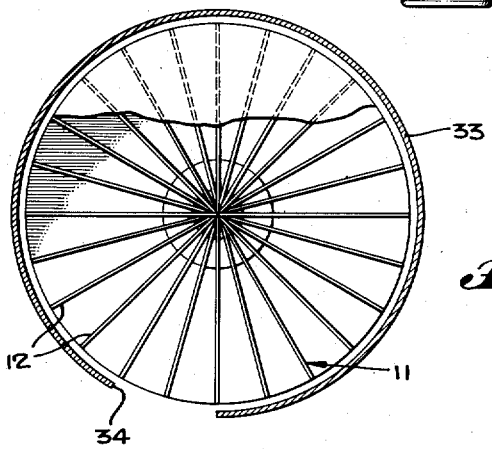
Fig. 10 is a reduced section through the cellular horn and tremolo creating device shown in Fig. 9.

Tremolo effects are also obtainable with the apparatus disclosed in Figs. 9 and 10. The cellular horn device 11 is essentially the same as disclosed in Fig. 1, this horn device being enclosed by a generally cylindrical cover 33 adjacent the periphery of the device, which has an opening 34 of one or two cell widths. This cover 33 is secured to a suitable disc 35 fastened to the hub 36 of a pulley 37. An endless belt 38 passes around the pulley 37 and also over a driving pulley 39 secured to the shaft 40 of an electric motor 41. By rotating the cover 33 at tremolo rates, the vibrato effect is obtained, since the sound reaching the ear of the listener is only emanating from one or two cells 12 at any one time, and is changing from cell to cell, so as to produce both an approaching and a receding sound or Doppler effect.

Many different effects can be accomplished by the arrangement shown in Figs. 6 to 10, inclusive. The cellular horn may be rotated at any desired speed, or stopped, while at the same time the throat 26 or the outer cover 33 may be rotated at tremolo speeds. The cellular horn and the tremolo unit can be rotated in the same direction or in reverse directions.

Figure 11:
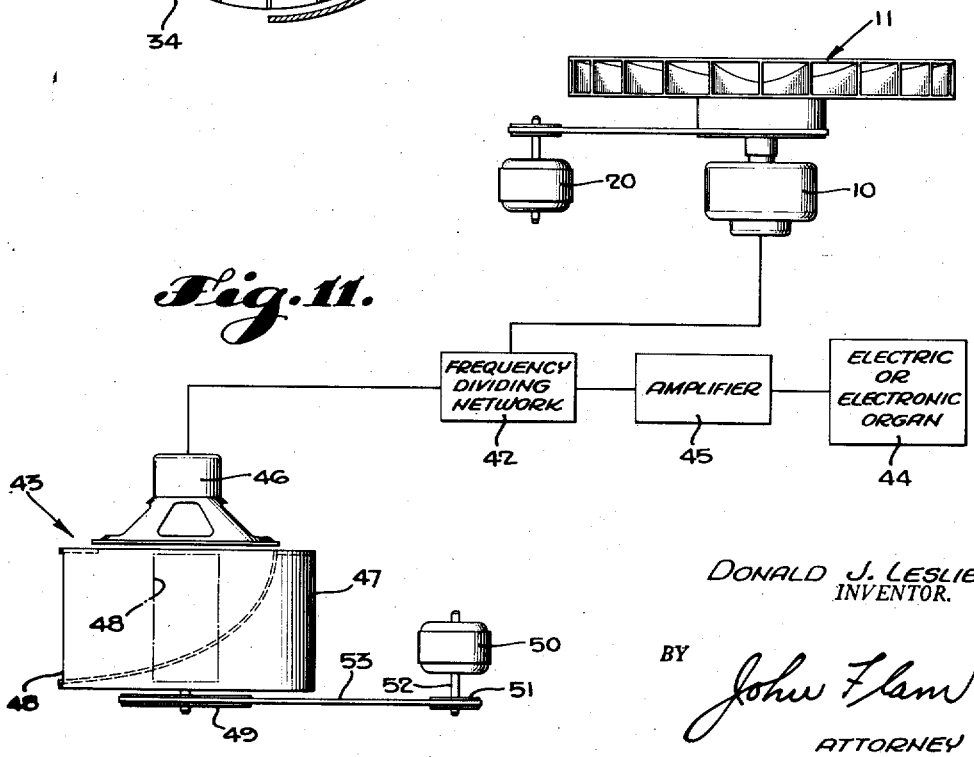
Fig. 11 is a somewhat diagrammatic view of still another form of the invention.

In the form of the invention disclosed in Fig. 11, a frequency dividing network 42 is employed for directing only the higher frequencies into the cellular horn device 11 and the lower frequencies into a tremolo producing device 43. In this manner, a broadening effect is imparted to the upper frequencies, while the lower frequencies possess tremolo.

In Fig. 11, the impulses from an electric or electronic organ 44 are amplified by a suitable amplifier 45 and are transmitted to the dividing network 42. Higher frequencies of, for example, above 400 cycles per second, pass to the high frequency speaker 10, and the lower frequencies, below 400 cycles per second, pass to a low frequency speaker 46. The low frequency speaker is associated with and is adjacent a directional horn 47 having a single mouth or sound emitting opening 48 spaced from its axis of rotation. This horn 47 is suitably supported and has a pulley 49 secured to it, in order that the horn may be rotated at tremolo speeds by an electric motor 50. This motor has a driving pulley 51 mounted on its shaft 52, and transmits its motion to the horn through an intervening endless belt 53 passing around both pulleys 49, 51.

The apparatus shown in Fig. 11, as described above, produces a broadening effect on the frequencies above 400 cycles per second, while the lower frequencies are caused to possess tremolo or vibrato. Instead of the single mouth 48 in the horn shown in Fig. 11, two horn mouths may be used 180 degrees apart, in which event the speed of rotation of the horn would be cut in half to produce the tremolo effects.

The inventor claims:

1. In apparatus for modifying sound: a horn device having a plurality of generally radial sound cells spaced substantially equiangularly and uniformly about the axis of the device; a sound channel coaxial with and located within said device and having wall means forming an opening, said opening being spaced from the common axis of said device and channel, said opening being registrable with the inner ends of said cells; and rotary means for continuously relatively rotating said horn device and said wall means.

2. In apparatus for imparting pitch tremolo to musical sounds: a rotatable horn device having a plurality of generally radial sound cells spaced equiangularly about the axis of the device; means for rotating said device; a sound channel coaxial with and located within the device and having wall means forming an opening, said opening being spaced from the common axis of said device and channel, said opening being registrable at any one time with only some of the inner ends of said cells; and means for rotating said wall means at a rate of from five to eight cycles per second.

3. In apparatus for modifying sound: a horn device having a plurality of generally radial sound cells spaced substantially equiangularly about the axis of the device; a sound channel coaxial with and located within said device and having wall means forming an opening, said opening being spaced from the common axis of said device and channel, said opening being registrable with the inner ends of said cells; and means for rotating said horn device at a peripheral speed of from fifteen to thirty-six feet per second and said wall means at a rate of from five to eight cycles per second.

4. In apparatus for modifying sound: a horn device having a plurality of generally radial sound cells spaced substantially equiangularly and uniformly about the axis of the device; a sound channel coaxial with and located within said device and having wall means forming an opening, said opening being spaced from the common axis of said device and channel, said opening being registrable with the inner ends of no more than two sound cells at any one time; and rotary means for continuously relatively rotating said horn device and said wall means.

5. In apparatus for modifying sound: a horn device having a plurality of generally radial sound cells spaced substantially equiangularly about the axis of the device; a non-rotary source of sound; a sound conduit for conducting sound waves from the source and having an opening spaced from the axis, said opening being registrable with the inner ends of said cells; and means for continuously rotating said conduit about said axis.

6. In apparatus for modifying sound: a horn device having a plurality of generally radial sound cells spaced substantially equiangularly and uniformly about the axis of the device; a sound channel coaxial with and located within said device and having wall means forming an opening, said opening being spaced from the common axis of said device and channel, said opening being registrable with the inner ends of said cells; first rotary means for continuously rotating said wall means about said axis; and second rotary means for continuously rotating said horn device about said axis.

7. In apparatus for modifying sound: a horn device having a plurality of generally radial sound cells spaced substantially equiangularly and uniformly about the axis of the device; a sound channel coaxial with and located within said device and having wall means forming an opening, said opening being spaced from the common axis of said device and channel, said opening being registrable with the inner ends of said cells; first rotary means for continuously rotating said wall means about said axis at a rate of from five to eight cycles per second; and second rotary means for continuously rotating said horn device about said axis at a rate such as to impart a peripheral velocity to the outer ends of said sound cells of the order of twenty feet per second.

*8. In apparatus for modifying sound: a horn device having a plurality of generally radial sound cells spaced substantially equiangularly about the axis of the device, the spacing between the outer ends of adjacent cells being substantially less than the arcuate extent of the outer ends of the cells whereby no vibratory swell or periodic change in amplitude is produced by rotation of the horn device; a sound channel registering with the inner ends of the cells; means for rotating said horn device to impart orbital movement to the outer ends of said cells; and rotary means operable independently of the horn rotation for spatially directing the sound waves about said axis for adding tremolo to the sound.*

References Cited in the file of this patent or the original patent

UNITED STATES PATENTS

| | | |
|---|---|---|
| 647,147 | Myers | Apr. 10, 1900 |
| 1,547,535 | Van Blaricom et al. | July 28, 1925 |
| 1,705,243 | Dunham | Mar. 12, 1929 |
| 2,049,616 | Lilja | Aug. 4, 1936 |

FOREIGN PATENTS

| | | |
|---|---|---|
| 477,113 | Germany | June 4, 1929 |